US011804746B2

(12) United States Patent
Bodla et al.

(10) Patent No.: US 11,804,746 B2
(45) Date of Patent: Oct. 31, 2023

(54) STATOR COOLING CHANNELS WITH INTERNAL FEATURES (71) Applicant: General Electric Company, Schenectady, NY (US)

(72) Inventors: Karthik K. Bodla, Fremont, CA (US); Naveenan Thiagarajan, Niskayuna, NY (US); Mohamed Osama, Garching (DE); John Russell Yagielski, Scotia, NY (US); David Allan Torrey, Ballston Spa, NY (US); Vandana Prabhakar Rallabandi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 128 days.

(21) Appl. No.: 17/007,003

(22) Filed: Aug. 31, 2020

(65) Prior Publication Data

US 2022/0069654 A1 Mar. 3, 2022

(51) Int. Cl.
*H02K 3/24* (2006.01)
*H02K 3/14* (2006.01)

(52) U.S. Cl.
CPC .................. *H02K 3/24* (2013.01); *H02K 3/14* (2013.01)

(58) Field of Classification Search
CPC .................................... H02K 3/24; H02K 3/14
See application file for complete search history.

(56) References Cited

U.S. PATENT DOCUMENTS

| 2,898,484 | A | 8/1959 | Krastchew |
| 9,589,705 | B2 | 3/2017 | Verhagen |
| 9,712,011 | B2 | 7/2017 | Pyrhonen et al. |
| 10,254,499 | B1 | 4/2019 | Cohen et al. |
| 2005/0285458 | A1* | 12/2005 | Moeleker ................. H02K 9/10 310/58 |
| 2011/0148244 | A1* | 6/2011 | Bliemeister ............. H02K 3/38 310/215 |
| 2016/0156146 | A1 | 6/2016 | Safari-Zadeh |
| 2017/0126084 | A1 | 5/2017 | Schweinert |
| 2018/0152068 | A1* | 5/2018 | Götz ........................ H02K 3/12 |
| 2018/0205299 | A1 | 7/2018 | Huang et al. |
| 2018/0348070 | A1* | 12/2018 | Wang ....................... G01K 1/14 |
| 2019/0178585 | A1 | 6/2019 | de Bock et al. |
| 2019/0257901 | A1 | 8/2019 | Tanaka et al. |

(Continued)

FOREIGN PATENT DOCUMENTS

JP S5475001 A 6/1979
JP S61247267 A 11/1986

OTHER PUBLICATIONS https://www.luvata.com/Products/Hollow-Conductors/ (Website Link Only).

*Primary Examiner* — Christopher M Koehler
*Assistant Examiner* — Viswanathan Subramanian
(74) *Attorney, Agent, or Firm* — Dority & Manning, P.A.

(57) ABSTRACT

An electric machine can include a stator core having a plurality of core teeth that define a plurality of core slots in a surface thereof. A winding can be housed at least partially in the core slots. The winding can include a tube defining a channel through at least a portion thereof and one or more wires disposed along a surface of the tube that is opposite the channel. A cooling system can be operably coupled with the channel and configured to move a cooling fluid through the channel.

20 Claims, 7 Drawing Sheets

(56) References Cited

U.S. PATENT DOCUMENTS

| | | |
|---|---|---|
| 2019/0260252 A1 | 8/2019 | Lambourne et al. |
| 2020/0153312 A1* | 5/2020 | Gerstler ................. H02K 9/193 |
| 2020/0161918 A1* | 5/2020 | Almeida E Silva ..... H02K 3/12 |
| 2020/0191000 A1* | 6/2020 | Pang ....................... F01D 5/189 |

* cited by examiner

STATOR COOLING CHANNELS WITH INTERNAL FEATURES

FIELD

The present subject matter relates generally to an electric machine having a cooling system fluidly coupled with one or more windings of the electric machine.

BACKGROUND

Electric machines, such as generators, motors, motor/generators, starter/generators, and other electric machines can be used for a variety of purposes. In operation, the electric machine includes a rotor that can be rotated relative to the stator to generate electrical energy and/or can be rotated relative to the stator as a result of changing magnetic fields induced in windings of the stator. During the operation of the electric machines, losses and heat are generated that may negatively affect the efficiency or performance of the electric machine. Accordingly, electric machines that are capable of rejecting additional heat would be useful.

BRIEF DESCRIPTION

Aspects and advantages of the invention will be set forth in part in the following description, or may be obvious from the description, or may be learned through practice of the invention.

In some embodiments of the present disclosure, an electric machine includes a stator core defining a plurality of core slots in a surface thereof. A winding is positioned at least partially in one of the plurality of core slots. The winding includes a tube defining a channel through at least a portion thereof and one or more wires disposed along the tube opposite the channel. A cooling system is operably coupled with the channel and is configured to move a cooling fluid through the channel.

In some embodiments of the present disclosure, a method of manufacturing an electric machine includes positioning one or more wires about a surface of a tube to form a winding. The tube defines a channel through at least a portion thereof and the one or more wires are separated from the channel by the tube. The method also includes operably coupling the winding to one of a stator core or a rotor of the electric machine. The method further includes fluidly coupling a cooling system to the channel.

In some embodiments of the present disclosure, a winding assembly for an electric machine includes a tube defining a channel through at least a portion thereof. The tube is configured to be operably coupled with a stator or a rotor of the electric machine One or more wires is positioned along the tube opposite the channel.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify the location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to cooling fluid flowpath in a fluid pathway. For example, "upstream" refers to the direction from which the cooling fluid flowpaths, and "downstream" refers to the direction to which the cooling fluid flowpaths.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

Generally, the present disclosure provides for an electrically conductive winding that may be operably coupled with a stator and/or a rotor of an electric machine, or any other device incorporating electrically conductive material. During operation, the rotor can be mechanically powered, driven, or rotated by a force, such as the mechanical energy of an engine, about an axis of rotation. The relative rotational motion of the rotatable rotor relative to the fixed or stationary stator generates electrical power in the one or more windings due to the interaction of the electric machine magnetic fields. The electrical power generated in the one or more windings can be conductively connected to, and further delivered to, at least one electrical load or power source. In some aspects, the electric machine can provide the electrical power to a power distribution system or power distributed network. By contrast, when operated as an electric motor, alternating current electric power (such as three-phase alternating current electric power) may be provided to the one or more windings of the stator which produces rotational movement of the rotor.

The electrically conductive winding may include a tube that defines a channel therein and one or more wires that may be positioned along an opposing side of the tube from the channel. Each of the tube and the one or more wires may be formed from a conductive material. In various examples, the one or more wires may be configured as a Litz-wire having a plurality of intertwined strands that may be independently insulated from one another.

A cooling system can be operably coupled with the channel and configured to move a cooling fluid through the channel. While the cooling fluid moves through the channel, heat is accepted from the windings into the cooling fluid that is then at least partially removed from the cooling fluid externally from the winding. The heated cooling fluid may be cooled through a heat exchanger that can be external from the windings.

The electric machine provided herein may enhance the thermal performance of electric machines that employ a cooling system. By implementing one or more Litz-wires along the tube, the electric machine can operate at a higher efficiency, produce more power, and/or have its packaging size reduced while operating at a common power to currently available electric machines.

Figure 1:
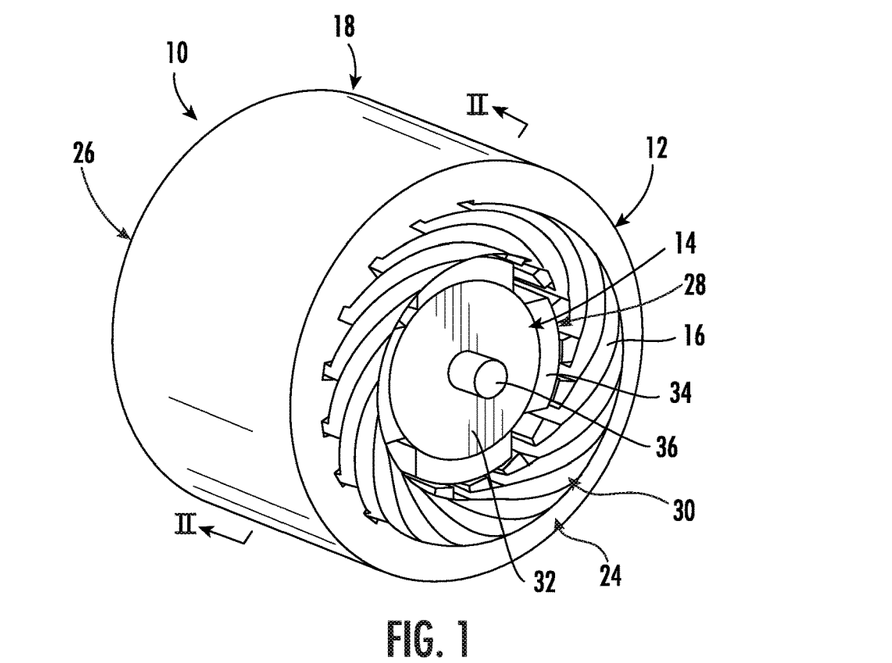
FIG. 1 is a perspective view of an electric machine having a rotor positioned within a stator core in accordance with various aspects of the present disclosure.
Figure 2:
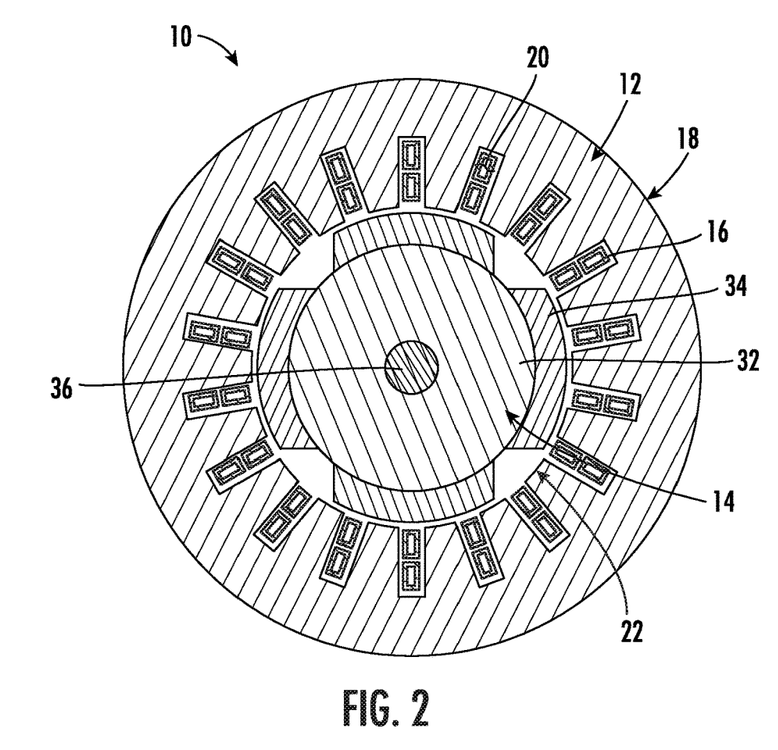
FIG. 2 is a cross-sectional view of the electric machine of FIG. 1 taken along the line II-II.

Referring now to the drawings, wherein identical numerals indicate the same elements throughout the figures, FIGS. 1 and 2 provide an electric machine 10 that includes a stator 12 operably coupled with a rotor 14. During operation, the rotor 14 can be mechanically powered, driven, or rotated by a force, such as the mechanical energy of an engine, about an axis of rotation. The rotational motion of the rotatable rotor 14 relative to the fixed or stationary stator 12 generates electrical power in the one or more windings 16 due to the interaction of the electric machine magnetic fields. The electrical power generated in the one or more windings 16 can be conductively connected to, and further delivered to, at least one electrical load or power source. In some aspects, the electric machine 10 can provide the electrical power to a power distribution system or power distributed network. By contrast, when operated as an electric motor, alternating current electric power (such as three-phase alternating current electric power) may be provided to the one or more windings 16 of the stator 12, which produces rotational movement of the rotor 14. In various embodiments, the electric machine 10 provided herein may be an alternating current (AC) synchronous, an AC induction, a switched reluctance, or any other practicable type of electric machine.

As provided in FIGS. 1 and 2, the stator 12 may include a stator core 18 and a winding 16 operably coupled with the stator core 18. The stator core 18 can have a generally cylindrical shape that can define a plurality of core slots 20 formed in a circumferential inner diameter 22 of the stator core 18. The core slots 20 can extend between a first end portion 24 and a second end portion 26 of the stator core 18. In various embodiments, the core slots 20 are generally equally spaced around the circumferential inner diameter 22 of the stator core 18, unequally spaced around the circumferential inner diameter 22 of the stator core 18, and/or a combination thereof. The core slots 20 define a radial depth, between the end portions 24, 26 of the core slots 20.

The core slots 20 are adapted to receive one or more windings 16. The core slots 20 may have a rectangular cross-sectional shape as can be seen in FIG. 1 and/or any other shape without departing from the teachings provided herein. In some embodiments, each winding 16 can have a plurality of segments that can include one or more slot segments 28 housed in the core slots 20 and one or more plurality of end loop segments 30.

Referring still to FIGS. 1 and 2, the rotor 14 can include a rotor core 32 and one or more windings 16 and/or magnets 34 supported by the rotor core 32. The rotor 14 can also support and/or be operably coupled with a rotatable shaft 36. In various embodiments, the rotor 14 can be, but is not limited to, a "claw pole" rotor, a permanent magnet non-claw pole rotor, a permanent magnet claw pole rotor, salient field wound rotor, or an induction type rotor.

Figure 3:
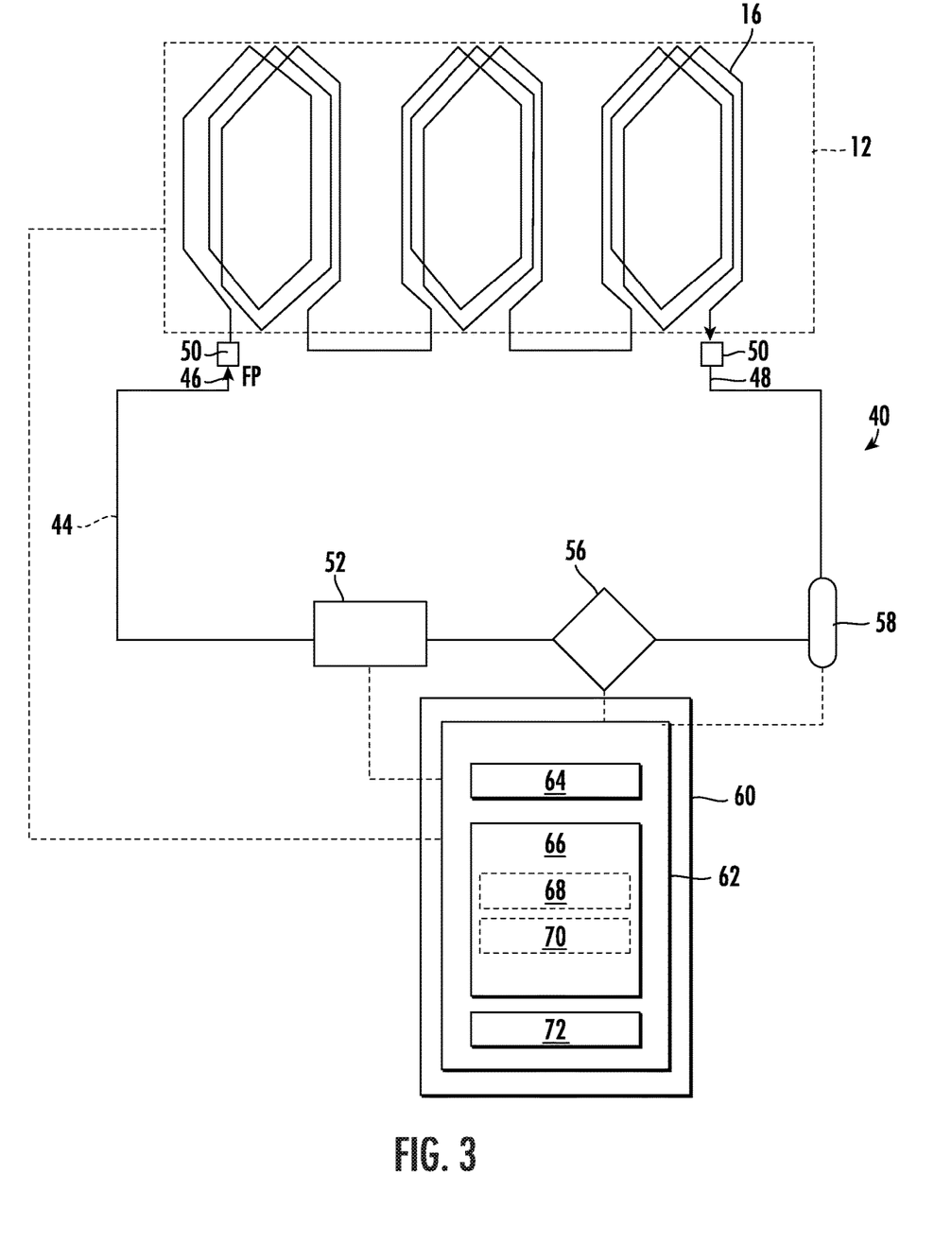
FIG. 3 is a schematic diagram of a cooling system operably coupled with one or more windings of the electric machine in accordance with various aspects of the present disclosure.
Figure 4:
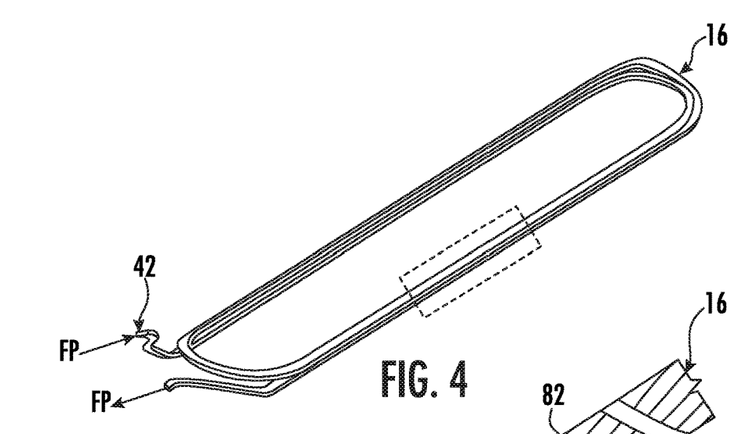
FIG. 4 is a perspective view of a portion of one of the windings defining a channel in accordance with various aspects of the present disclosure.

FIG. 3 provides a schematic view of an electric machine 10 and cooling system 40 in accordance with an embodiment of the present disclosure. FIG. 4 provides an isolated, perspective view of a winding of the electric machine 10 in FIG. 3. In order to maintain a temperature of the electric machine 10 (FIG. 1) within a desired operating temperature range while in operation, the electric machine 10 can include a cooling system 40. In some embodiments, one or more of the windings 16 of the electric machine 10 may define a channel 42 extending therethrough that is in fluid communication with the cooling system 40. In some embodiments, each winding 16 may be independently coupled with the cooling system 40, and/or a first winding 16 may be fluidly coupled to a second winding 16 and coupled to the cooling system 40 in series.

In some embodiments, the cooling system 40 may provide the windings 16 of the stator 12 and/or the rotor 14 with a cooling fluid 44 in the form of a lubrication oil, a consumable liquid (such as water), a gas, a supercritical vapor, and/or any other suitable cooling fluid. In various embodiments, the cooling fluid 44 may have a high specific heat capacity to transport heat from the winding 16 to the cooling system 40 via the cooling fluid flowpath FP, a low dynamic viscosity to reduce the amount of power needed for moving the cooling fluid 44 through the cooling system 40 and the channel 42, a high flash/boiling temperature to allow for a high operating temperature, a high dielectric strength to withstand electrical potential differences across the winding 16 (otherwise corona could occur that would start pitting the insulation of the winding 16 and corroding it), be electric insulative to avoid electric short circuit through the cooling fluid 44 leading to axial circulating currents (due to potential difference across the winding 16 axially) which increase the losses, and/or a high corrosion resistance to avoid corroding over time the parts of the electric machine 10 the cooling fluid 44 contacts.

In various embodiments, such as the example illustrated in FIG. 3, the cooling system 40 can include a cooling system supply line 46 and a return line 48 in communication with the one or more of the windings 16. The cooling system supply line 46 and return line 48 transport the cooling fluid 44 to and from the channel 42. It will be understood that the cooling system supply line 46 and return line 48 may be formed in a variety of configurations suitable for this purpose. Moreover, in some embodiments, an insulative break 50 may be disposed along each of the supply lines 46 and return lines 48, for example, to prevent current flow from the windings 16 to the cooling system 40 in embodiments where the cooling system 40 may include an electrically conductive material (e.g., metal).

A pump assembly 52 (and/or compressor assembly) is positioned between the cooling system supply line 46 and the return line 48 opposite the one or more windings 16. The pump assembly 52 can move the cooling fluid 44 through the channels 42. In some embodiments, the pump assembly 52 may be configured to maintain the flow rate of the cooling fluid 44 below a maximum desired flow rate, which may reduce and/or prevent erosion of the channel 42.

In some instances, the cooling system 40 can include a heat exchanger 56 in communication with both the cooling system supply line 46 and the return line 48. In some instances, the heat exchanger 56 can be positioned between the windings 16 and the pump assembly 52 or in any other location within the cooling assembly. In some examples, the heat exchanger 56 can be configured to transfer thermal energy from the cooling fluid 44 to the atmosphere, which can reduce the temperature of the cooling fluid 44. Although a heat exchanger 56 has been referenced herein, it should be understood that the present disclosure contemplates the use of any present or future methodologies for the transfer of thermal energy that will function as described and claimed.

In some examples, the cooling fluid 44 flow may be considered closed-loop. However, losses of the cooling fluid 44 are contemplated during normal operation. To this end, the cooling system 40 may further include a reservoir 58 in communication with the return line 48 in order to replace any losses of the cooling fluid 44.

With further reference to FIGS. 3 and 4, the cooling system 40, the stator 12, and/or the electric machine 10 can further include (or be operably coupled with) a computing system 60 that causes the electric machine 10 to perform certain functions, such as operation of the pump assembly 52. One or more functions may be controlling any of the components of the cooling system 40 and/or of the electric machine 10. The computing system 60 can include one or more computing device(s) 62. The computing device(s) 62 can include one or more processor(s) 64 and one or more memory device(s) 66. The one or more processor(s) 64 can include any suitable processing device, such as a microprocessor, microcontroller, integrated circuit, logic device, and/or other suitable processing device. The one or more memory device(s) 66 can include one or more computer-readable media, including, but not limited to, non-transitory computer-readable media, RAM, ROM, hard drives, flash drives, and/or other memory devices.

The one or more memory device(s) 66 can store information accessible by the one or more processor(s) 64, including computer-readable instructions 68 that can be executed by the one or more processor(s) 64. The instructions 68 can be any set of instructions that when executed by the one or more processor(s) 64, cause the one or more processor(s) 64 to perform operations. In some embodiments, the instructions 68 can be executed by the one or more processor(s) 64 to cause the one or more processor(s) 64 to perform operations, such as any of the operations and functions for which the computing system 60 and/or the computing device(s) 62 are configured, the operations for operating the cooling system 40 and/or the electric machine 10, and/or any other operations or functions of the one or more computing device(s) 62. The instructions 68 can be software written in any suitable programming language or can be implemented in hardware. Additionally, and/or alternatively, the instructions 68 can be executed in logically and/or virtually separate threads on the processor(s) 64. The memory device(s) 66 can further store data 70 that can be accessed by the processor(s) 64. For example, the data 70 can include data indicative of electric machine temperature, winding temperature, cooling fluid temperature, cooling fluid flow rate, efficiency gain based on the use of the cooling system 40, and/or any other information. In some embodiments, these parameters may be used to adjust the cooling system 40, such as adjusting the coolant flow, in order to optimize operation, for aspects such as improved cooling system efficiency and increased uniformity of winding temperatures.

The computing device(s) 62 can also include a network interface 72 used to communicate, for example, with the other components of the cooling system 40 or any remote electronic device (e.g., via a network). The network interface 72 can include any suitable components for interfacing with one or more network(s), including, for example, transmitters, receivers, ports, controllers, antennas, and/or other suitable components. One or more external display devices (not depicted) can be configured to receive one or more commands, data, and/or information from the computing device(s) 62.

Figure 5:
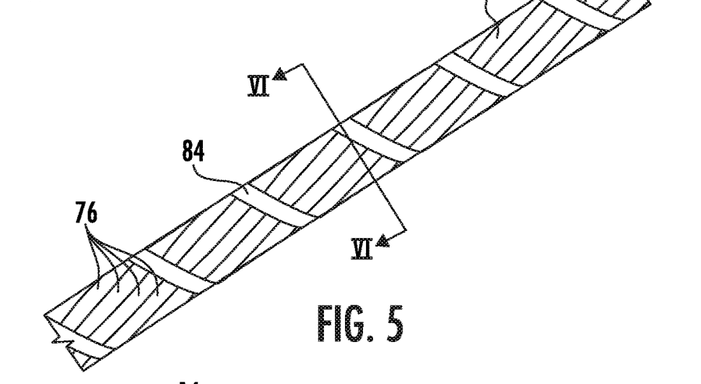
FIG. 5 is a perspective view of an end portion of one of the windings defining a channel in accordance with various aspects of the present disclosure.
Figure 6:
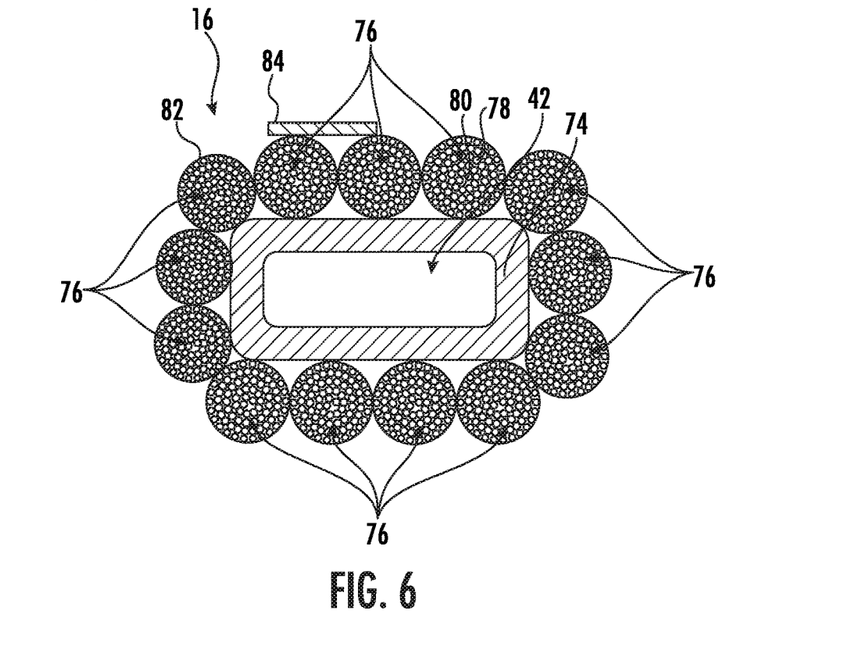
FIG. 6 is a cross-sectional view of one of the windings taken along the line VI-VI of FIG. 5 in accordance with various aspects of the present disclosure.
Figure 7:
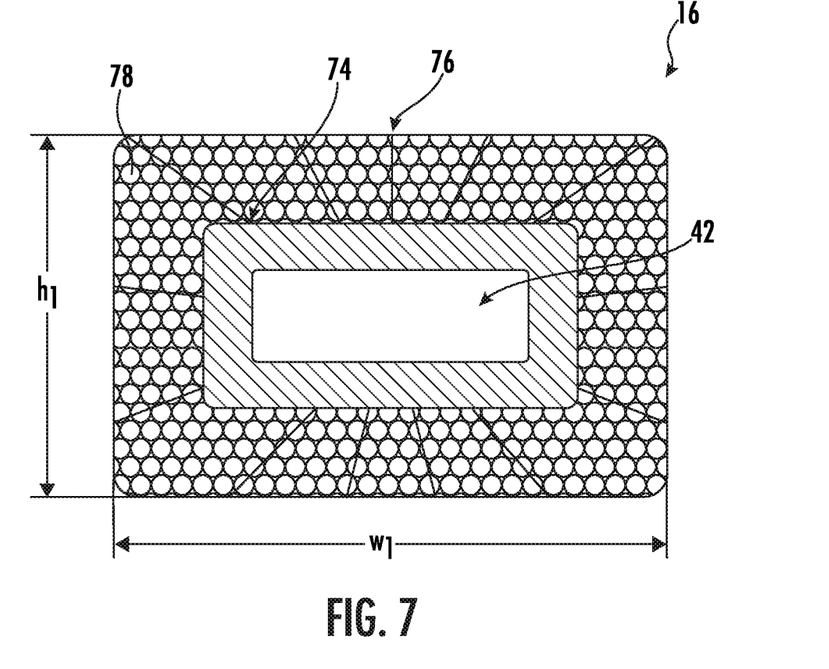
FIG. 7 is a schematic cross-sectional view of one of the windings taken along the line VI-VI of FIG. 5 in accordance with various aspects of the present disclosure.

Referring now to FIGS. 5-7, various views of a winding 16 of the present disclosure are provided. FIG. 5 provides a perspective view of an end portion of one of the windings defining a channel according to some embodiments. FIG. 6 provides a cross-sectional view of one of the windings taken along the line VI-VI of FIG. 5. FIG. 7 provides a schematic cross-sectional view of one of the windings taken along the line VI-VI of FIG. 5. In the illustrated embodiments, the winding 16 includes a tube 74 that defines the channel 42 and one or more elongated wires 76 disposed on an opposing side of the tube 74 from the channel 42. In some instances, the one or more elongated wires 76 may form the tube 74 and/or the assembly may be free of the tube 74. It may be noted that while the winding 16, the tube 74, and the channel 42 of FIGS. 6 and 7 are shown in the example illustrations as having a generally rectangular shape, other shapes may be employed in alternative embodiments. It may further be noted that each of the tube 74 and the one or more wires 76 may be formed from a conductive or insulative material. In various embodiments, the tube 74 may be formed through an additive manufacturing process. For example, Electron Beam Melting (EBM) may be used to form the winding 16 from a material having a high conductivity. It will be appreciated, however, that in other embodiments, the winding 16 may be formed from any other suitable additive manufacturing process and/or any other suitable manufacturing process.

In some examples, each of the plurality of wires 76 may be a Litz-wire having multiple conductive strands 78 that can be individually coated with an insulating layer 80 and then woven or braided. During the operation of the electric machine 10, electric currents can tend to distribute themselves within a conductor so that the current density near the surface of the conductor is greater than the current density nearer to the center. This phenomenon is often referred to as the "skin effect." In some high-frequency applications, the skin effect becomes more pronounced, resulting in power loss. The skin effect may be reduced by the use of the Litz wire as the Litz wire increases the resistance of the conductor to induced circulating currents, thereby reducing the overall skin effect in the resulting wire.

With further reference to FIGS. 5-7, each of the wires 76 can include an outer jacket 82 surrounding and housing the multiple conductor strands 78. The jacket 82 may insulate each wire from adjacently positioned wires 76. In some embodiments, each of the elongated structures may extend around a portion of the tube 74, in a parallel or a non-parallel direction relative to the tube 74.

In some instances, one or more straps 84 may be positioned around the tube 74 and the one or more wires 76 positioned along the tube 74, which may allow for the wires 76 to be in close contact with the tube 74. In some instances, the straps 84 may extend in a generally perpendicular direction relative to one or more of the wires 76. In various embodiments, the straps 84 may be electrically insulative, generally thermally insulative, and/or a combination thereof.

In various embodiments, the one or more wires 76 may be positioned about the tube 74, as illustrated in FIG. 6, and/or one or more strands 78 may be distributed around the tube 74, as illustrated in FIG. 7. Further, for the embodiment of FIG. 6, the one or more wires 76 includes a plurality of wires 76, with the plurality of wires substantially completely surrounding and enclosing the tube 74 (e.g., at least 90% surrounded, such as at least 95% surrounded, such as 100% surrounded). Further for the embodiment shown, the plurality of wires 76 includes at least 4 wires, such as at least 8 wires, such as at least 10 wires, such as at least 12 wires, such as up to 1,000 wires (counting each of the strands 78 in a Litz-wire configuration as being included in a single Litz-wire).

In various embodiments, the tube 74 may be formed from a first material that may be thermally conductive. The tube 74, in some instances, may also be electrically conductive. Likewise, the wires 76 and/or the strands 78 may be formed from a second material that are also electrically conductive. In various embodiments, the first material may be common with the second material. More specifically, in certain embodiments, the first material may be common by incorporating at least one element that is the same in each of the first and second materials and/or the first and second materials may be the same compound.

It will be appreciated, however, that in other embodiments, the first material may be different from the second material. In such a manner, the first material may define a higher thermal conductance than the second material, and/or the second material may define a higher electrical conductance than the first material.

In one or more of these embodiments, the first and/or second materials may be a material at least partially containing copper (e.g., at least 99% pure copper). In other examples, the first and/or second materials may be formed from any other electrically and/or thermally conductive material, such as copper alloys, silver, aluminum, aluminum alloys, and/or carbon-nano-tubes (CNT).

Figure 8:
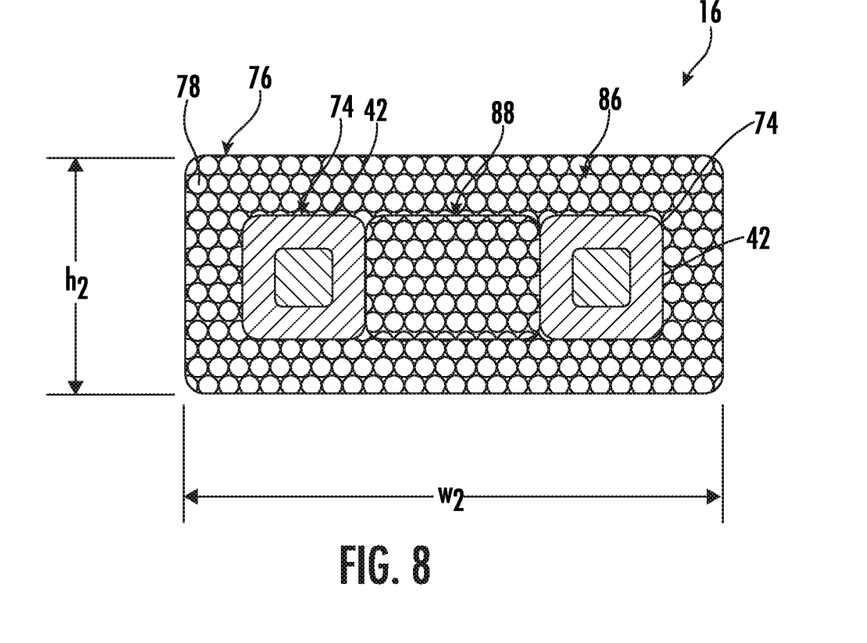
FIG. 8 is a schematic cross-sectional view of one of the windings taken along the line VI-VI of FIG. 5 in accordance with various aspects of the present disclosure.

It will further be appreciated that in other embodiments, the winding 16 may have any other suitable configuration. For example, referring now to FIG. 8, a winding in accordance with still another embodiment of the present disclosure is provided. In the embodiment of FIG. 8, the winding 16 is configured in substantially the same manner as the winding 16 of FIGS. 5 and 6. However, the winding 16 of FIG. 8 additionally includes more than one tube 74, as well as multiple sets of wires 76. In particular, for the embodiment of FIG. 8, the winding 16 includes two tubes 74, a first set 86 of wires 76 and a second set 88 of wires 76. Each tube 74 may be made from a first material (or each tube 74 may be made from a different material), the first set 86 of wires 76 may be made from a second material, and the second set 88 of wires 76 may be formed from a third material. In some instances, each of the first, second, and third materials may be generally common, and/or any of the first, second, and third materials may differ in composition from any of the remaining first, second, and third materials. As provided above, the first, second, and/or third materials may be a material at least partially containing copper (e.g., at least 99% pure copper), copper alloys, silver, aluminum, aluminum alloys, and/or carbon-nano-tubes (CNT), or any other practicable material.

For the embodiment of FIG. 8, the one or more tubes 74 includes a first tube 74 and a second tube 74 that are separated from one another by the second set 88 of wires 76 (e.g., the second set 88 of wires 76 is positioned at least partially between the first and second tubes 74). Further for this embodiment, the first set 86 of wires 76 is positioned around the first tube 74, the second tube 74, and the second set 88 of wires 76 in combination. In such a manner, for the embodiment depicted, the first set 86 of wires 76 enclose the first tube 74, the second tube 74, and the second set 88 of wires 76.

In some embodiments, both the first and the second set 86, 88 of wires 76 may be configured as Litz-wires. However, in other embodiments, one of the first or second sets 86, 88 of wires 76 may be a Litz-wire while the other may be any other type of conductor. Further, in some embodiments, both the first and second set 86, 88 of wires 76 may be configured as any other type of conductor other than a Litz-wire. In some instances, the first set 86 of wires 76 is of a first gauge and the second set 88 of wires 76 is of a second gauge. In various embodiments, the first gauge may be different from the second gauge. Such may, e.g., allow for the efficient carrying of a variety of currents and voltages.

Alternatively, however, in other embodiments, the first and second gauges may be common. Such may, e.g., allow for the winding 16 to most efficiently carry a desired current and/or voltage.

In some embodiments, such as the example illustrated in FIG. 7, the winding 16 may have a first height h1 and a first width w1. Similarly, in the embodiment illustrated in FIG. 8, the winding 16 may have a second height h2 and a second width w2. In some instances, the second height may be less than the first height while the first and second widths may be generally equal. Accordingly, by including the first and second sets 86, 88 of wires 76, or any wires 76 between the tubes 74, as illustrated in FIG. 8, the overall package size of the winding 16 may be reduced, and/or heat rejection of the electric machine 10 may be increased.

Figure 9:
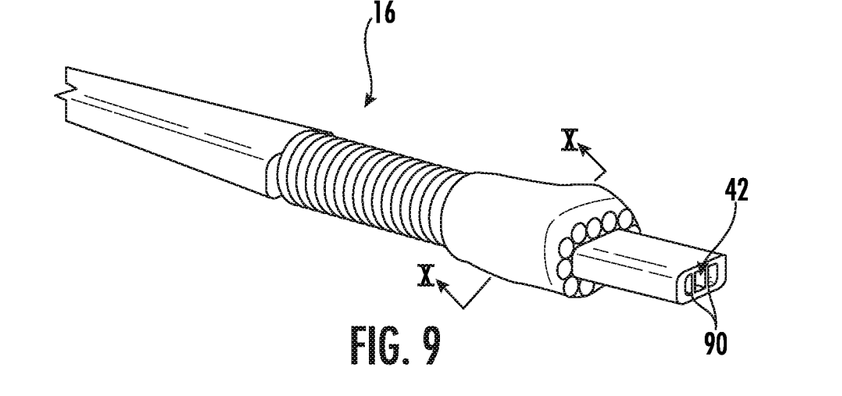
FIG. 9 is a perspective view of an end portion of one of the windings defining a channel in accordance with various aspects of the present disclosure.
Figure 10:
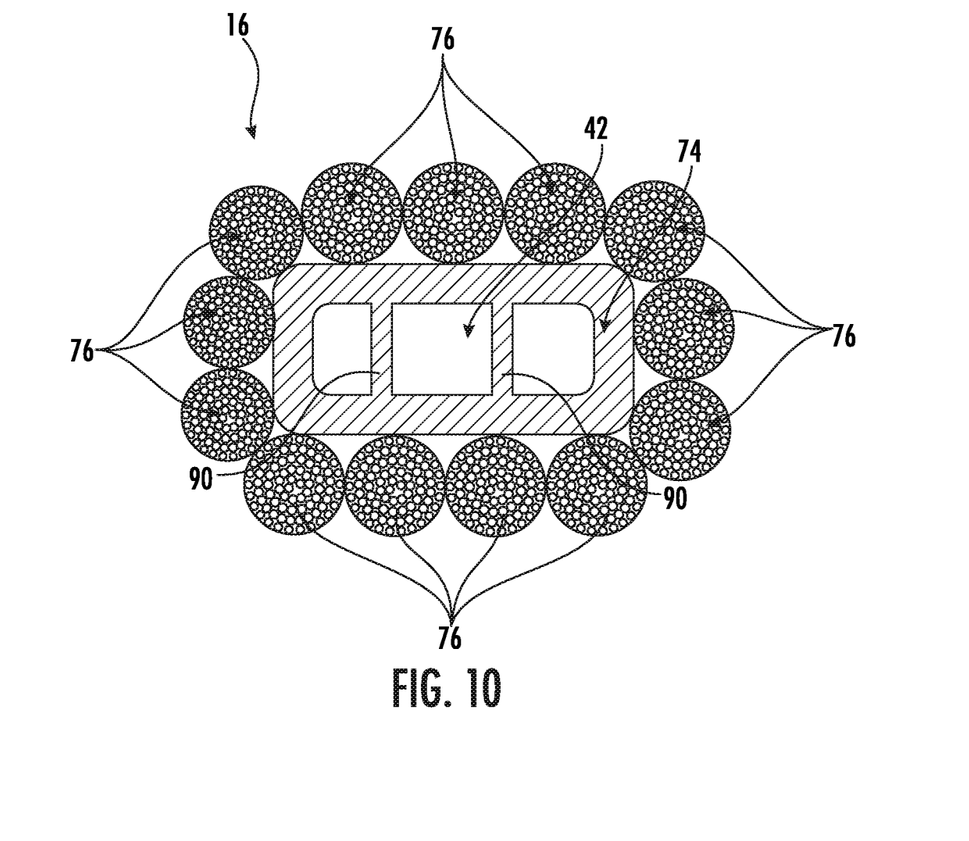
FIG. 10 is a cross-sectional view of one of the windings taken along the line X-X of FIG. 9 in accordance with various aspects of the present disclosure.
Figure 11:
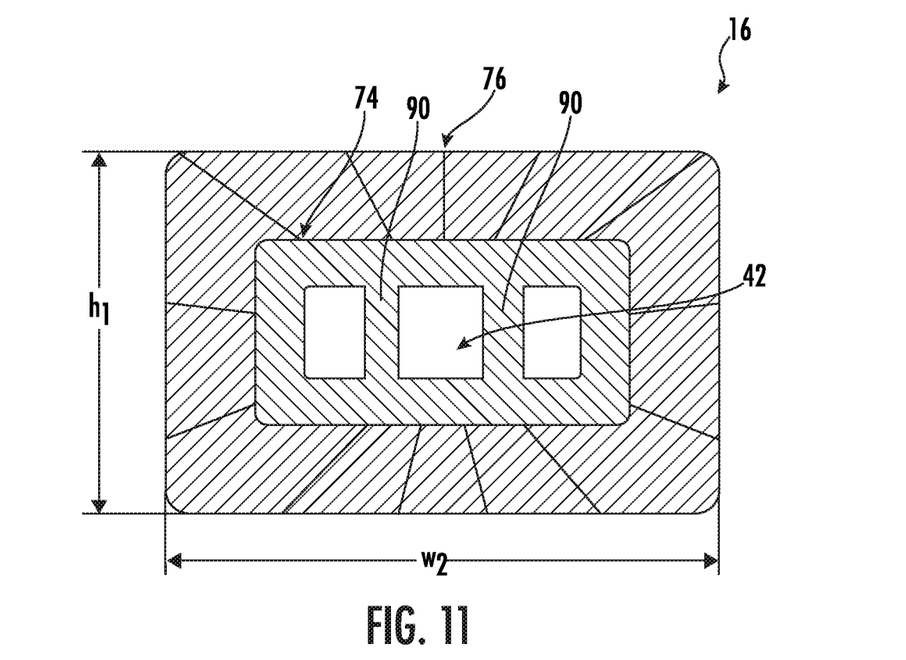
FIG. 11 is a schematic cross-sectional view of one of the windings taken along the line X-X of FIG. 9 in accordance with various aspects of the present disclosure.
Figure 12:
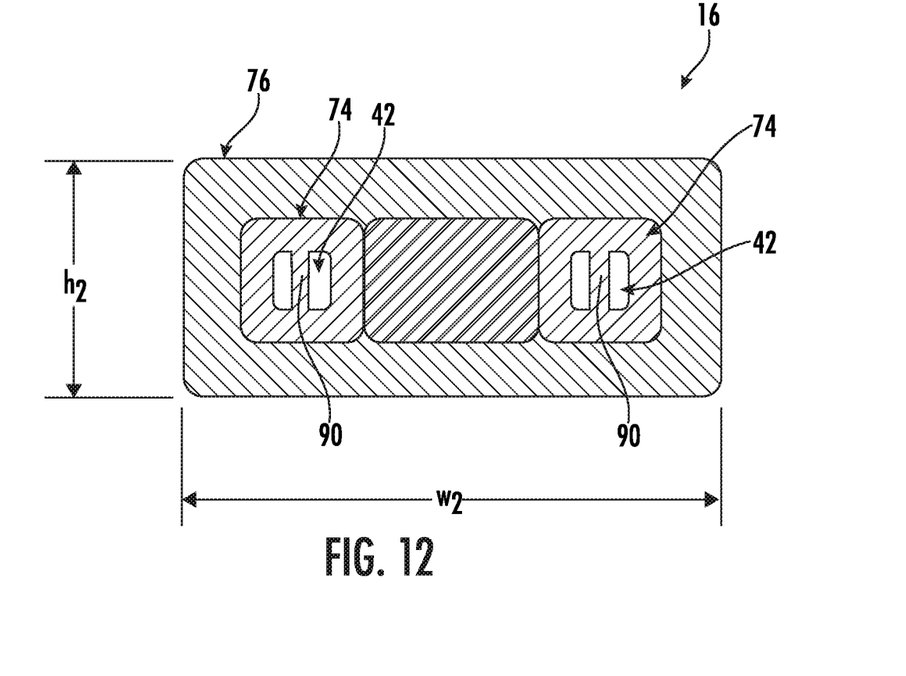
FIG. 12 is a schematic cross-sectional view of one of the windings taken along the line X-X of FIG. 9 in accordance with various aspects of the present disclosure.

Referring to FIGS. 9-12, views of a variety of windings 16 in accordance with additional embodiments of the present disclosure are provided. In particular, FIG. 9 shows a perspective view of an end portion of one of the windings defining a channel according to some embodiments, FIG. 10 shows a cross-sectional view of one of the windings taken along the line X-X of FIG. 9, and FIG. 11 shows a schematic cross-sectional view of one of the windings taken along the line X-X of FIG. 9, and FIG. 12 shows a schematic cross-sectional view of one of the windings taken along the line X-X of FIG. 9 in accordance with various aspects of the present disclosure.

In these embodiments, one or more internal surface features 90 (e.g., turbulators) positioned within the channel 42 may affect the flow of the fluid 44 through the channel 42 through altering a pressure, altering a flow rate, changing a flow from a laminar flow to a turbulent flow (or vice versa), increasing the surface area of the channel 42 along the winding 16 thereby increasing heat rejection properties of the winding 16, etc. Generally, the more turbulent the flow, all other things being equal, the greater the rate of heat transfer. Stated another way, the higher the Reynolds number, the more rapid the rate of heat transfer. Further, the internal surface features 90 may have a different concentration along the channel 42 of the winding 16 based on local heat production of various portions of the windings 16 which can enhance heat removal from the winding 16 through the cooling system 40 and/or maintain a more uniform temperature along the winding 16.

In various embodiments, the internal surface features 90 may be in the form of pins that extend within at least a portion of the channel 42 of the winding 16 to promote mixing of the flow of the fluid 44 as it travels through the channel 42. However, in other embodiments, the internal features 90 could include, but not limited to, fins (rectangular, pin fins etc.), studs, dimples, etc. that extend into the channel 42 to interact with the fluid 44. In other embodiments, including circular cross-section channels 42, the internal features could be fluted fins/channels of various cross-sections that improve heat transfer by inducing a secondary flow. In any form, the internal surface features 90 may increase a Reynolds number indicating an increase in turbulence of the flow of the fluid 44 through the channel 42. The location, dimensions and frequency of the internal surface features 90 can be chosen to minimize the increase of a power loss coefficient due to their existence creating a higher a higher pressure for moving the cooling fluid 44 through the channel 42.

Figure 13:
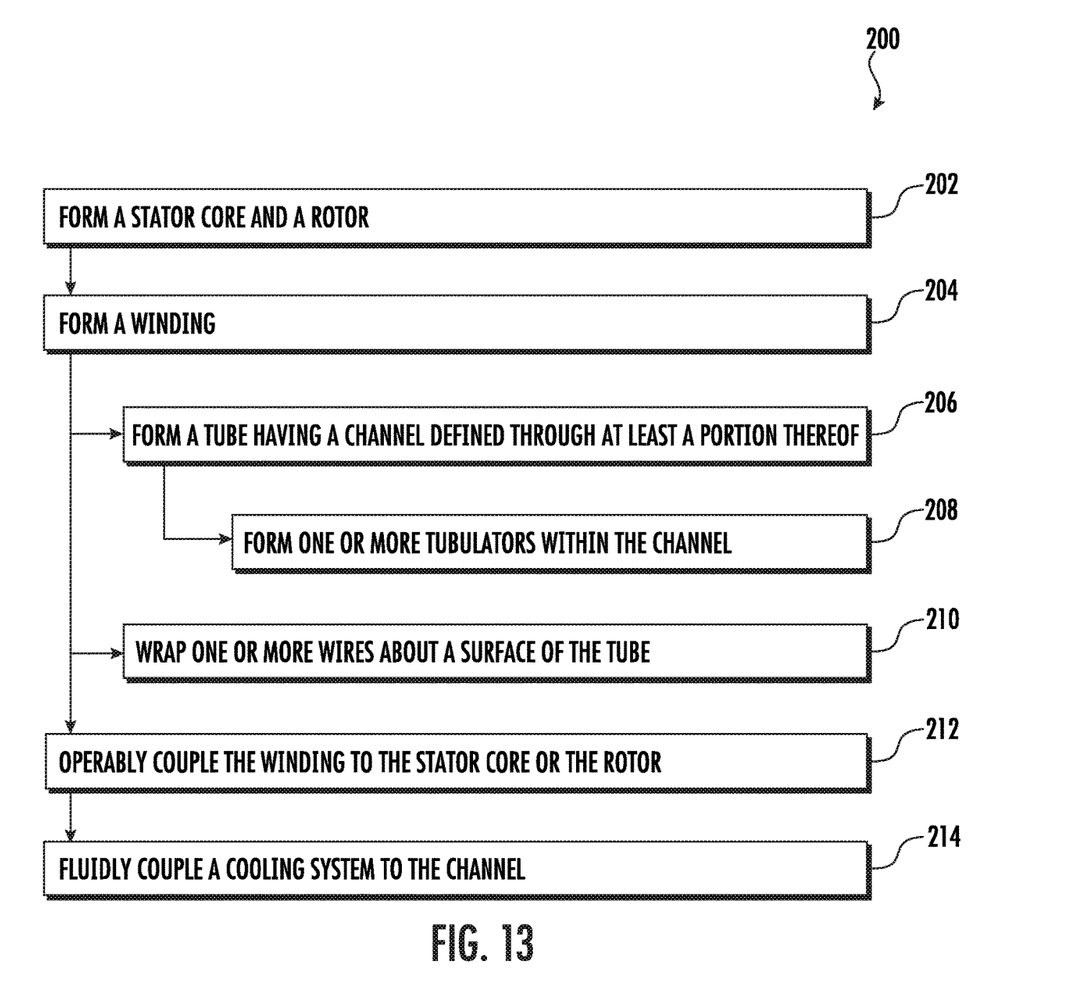
FIG. 13 is a flow diagram of a method for operating the electric machine in accordance with various aspects of the present disclosure.

Referring now to FIG. 13, a flow diagram is provided of a method 200 for manufacturing an electric machine in accordance with various aspects of the present disclosure. The electric machine manufactured by the disclosed method may be configured in accordance with one or more of the embodiments described hereinabove and depicted in FIGS. 1 through 12. As such, in at least certain aspects, the electric machine 10 operated by the method 200 may be incorporated into an engine, such as an aeronautical gas turbine engine, and may include a stator and a rotor.

As is depicted, the method 200 includes at (202) forming a stator core and a rotor. As provided herein, the stator core and the rotor may be formed through any practicable method. Moreover, the stator core may be positioned outwardly and/or inwardly of the rotor in various embodiments.

At (204), the method includes forming a winding, which can include, at (206), forming a tube having a channel defined through at least a portion thereof. In some instances, forming the tube may further include, at (208), forming one or more internal surface features within the channel that may be configured to alter a pressure, altering a flow rate, change a flow from a laminar flow to a turbulent flow (or vice versa), increase the surface area of the channel along the winding thereby increasing heat rejection properties of the winding, etc.

At (210), the method can include wrapping one or more wires about a surface of the tube, which may be on an opposite side of the tube from the channel. Further, the wrapping can include positioning one or more wires about a surface of a tube to form a winding with the tube defining a channel through at least a portion thereof. In various embodiments, the one or more wires are separated from the channel by the tube. In some embodiments, the one or more wires may include a Litz-wire that includes a plurality of strands that are intertwined to form the wire.

At step (212), the method may include operably coupling the winding to the stator core or the rotor core. Once the winding is coupled with one of the stator core or the rotor core, the method, at step (214), can include fluidly coupling a cooling system to the channel. In some embodiments, fluidly coupling the cooling system to the channel further includes fluidly coupling a pump and a heat exchanger in series between the supply line and the return line. In some instances, the method, at step (216), can include fluidly coupling a cooling system to the channel includes coupling a supply line to one end portion of the winding and a return line to a second end portion of the winding.

In operation, heat is generated by the electric machine. Simultaneously, the cooling system operably coupled with the channel is configured to move a cooling fluid through the channel. While the cooling fluid moves through the channel, heat is accepted from the windings into the cooling fluid that is then at least partially removed from the cooling fluid externally from the winding. In addition, the cooling fluid may contact one or more internal surface features within the channel, which can create a less laminar flow within the channel to increase thermal transfer of heat into the cooling fluid and/or increase a surface area of the winding to increase an amount of heat that may be transferred to the cooling fluid. The heated cooling fluid may be cooled through a heat exchanger that can be external from the windings.

Therefore, the electric machine, having the cooling system provided herein, can improve the thermal performance of electric machines by enhancing the heat transfer coefficient (HTC) of the electric machine. By operating in accordance with one or more these aspects, the electric machine provided in FIGS. 1-12 and/or the method 200 provided in FIG. 13 may provide for a more efficient electric machine due to the lowered operating temperature. The electric machine may, therefore, be capable of producing more electric power when operated as a generator and/or more efficiently use electric power when operated as a motor. Alternatively, the size of the electric machine can be reduced by virtue of being able to more effectively remove heat generated within the windings of the electric machine. In some applications the size (and mass) of the electric machine can be more important than the efficiency of the electric machine.

Further aspects of the present disclosure may be provided in the following clauses:

An electric machine comprising: a stator core defining a plurality of core slots in a surface thereof; a winding positioned at least partially in one of the plurality of core slots, the winding including a tube defining a channel through at least a portion thereof and one or more wires disposed along the tube opposite the channel; and a cooling system operably coupled with the channel and configured to move a cooling fluid through the channel.

The electric machine of one or more of these clauses, further comprising: a controller operably coupled to the cooling system and configured to operate a pump of the cooling system.

The electric machine of one or more of these clauses, wherein the one or more wires are configured as a Litz-wire having a plurality of strands.

The electric machine of one or more of these clauses, wherein each of the plurality of strands is individually coated with an insulating layer.

The electric machine of one or more of these clauses, wherein the one or more wires includes a plurality of wires positioned about an outer surface of the tube, and wherein each of the plurality of wires includes an outer jacket.

The electric machine of one or more of these clauses, further comprising: a strap disposed around each of the plurality of wires, wherein the strap extends in a generally perpendicular direction to each of the plurality of wires.

The electric machine of one or more of these clauses, wherein the channel includes a first channel and a second channel separate from the first channel.

The electric machine of one or more of these clauses, wherein the one or more wires includes a first set of wires positioned between the first and second channels and a second set of wires positioned about the first channel, the second channel, and the first set of wires.

The electric machine of one or more of these clauses, wherein the first set of wires is of a first gauge and the second set of wires is of a second gauge, the first gauge different from the second gauge.

The electric machine of one or more of these clauses, further comprising: one or more internal surface features within the channel.

The electric machine of one or more of these clauses, wherein the tube is formed from a first material and the one or more wires include a second material, and wherein the first material is common with the second material.

The electric machine of one or more of these clauses, wherein the tube is formed from a first material and the one or more wires include a second material, and wherein the first material is different from the second material.

A method of manufacturing an electric machine, the method comprising: positioning one or more wires about a surface of a tube to form a winding, wherein the tube defines a channel through at least a portion thereof, and wherein the one or more wires are separated from the channel by the tube; operably coupling the winding to one of a stator core or a rotor of the electric machine; and fluidly coupling a cooling system to the channel.

The method of one or more of these clauses, wherein the one or more wires are each configured as a Litz-wire having a plurality of strands.

The method of one or more of these clauses, wherein fluidly coupling the cooling system to the channel includes coupling a supply line to one end portion of the winding and a return line to a second end portion of the winding.

The method of one or more of these clauses, wherein fluidly coupling the cooling system to the channel further includes fluidly coupling a pump and a heat exchanger in series between the supply line and the return line.

A winding assembly for an electric machine comprising: a tube defining a channel through at least a portion thereof, the tube configured to be operably coupled with a stator or a rotor of the electric machine; and one or more wires, the one or more wires positioned along the tube opposite the channel.

The electric machine of one or more of these clauses, wherein the one or more wires configured as Litz-wires and a cooling system is operably coupled with the channel and configured to move a cooling fluid through the channel.

The electric machine of one or more of these clauses, wherein the one or more wires includes a first set of wires and a second set of wires, and wherein the tube includes a first tube and a second tube.

The electric machine of one or more of these clauses, wherein the second set of wires is positioned between the first and second tubes and the first set of wires is positioned around the first tube, the second tube, and the second set of wires.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electric machine comprising:
a stator core defining a plurality of core slots in a surface thereof;
a winding positioned at least partially in one of the plurality of core slots, the winding including a tube defining a channel through at least a portion thereof and one or more wires disposed along the tube opposite the channel, wherein the channel includes a first end portion and a second, opposing end portion;
one or more internal surface features within the channel, the one or more internal structures extending from a bottom portion of the channel to a top portion of the channel;
a cooling system including a supply line operably coupled with the first end portion and a return line operably coupled with the second end portion, the cooling system configured to move a cooling fluid through the channel; and
an insulative break disposed along each of the supply lines and return lines to prevent current flow from the winding to the cooling system.

2. The electric machine of claim 1, further comprising:
a controller operably coupled to the cooling system and configured to operate a pump of the cooling system.

3. The electric machine of claim 1, wherein the one or more wires are configured as a Litz-wire having a plurality of strands.

4. The electric machine of claim 3, wherein each of the plurality of strands is individually coated with an insulating layer.

5. The electric machine of claim 1, wherein the one or more wires includes a plurality of wires positioned about an outer surface of the tube, and wherein each of the plurality of wires includes an outer jacket.

6. The electric machine of claim 5, further comprising:
a strap disposed around each of the plurality of wires, wherein the strap extends in a generally perpendicular direction to each of the plurality of wires.

7. The electric machine of claim 1, wherein the channel includes a first channel and a second channel separate from the first channel.

8. The electric machine of claim 7, wherein the one or more wires includes a first set of wires positioned between the first and second channels and a second set of wires positioned about the first channel, the second channel, and the first set of wires.

9. The electric machine of claim 8, wherein the first set of wires is of a first gauge and the second set of wires is of a second gauge, the first gauge different from the second gauge.

10. The electric machine of claim 1, wherein the tube is formed from a first material and the one or more wires include a second material, and wherein the first material is common with the second material.

11. The electric machine of claim 1, wherein the tube is formed from a first material and the one or more wires include a second material, and wherein the first material is different from the second material.

12. The electric machine of claim 1, wherein the channel has a generally square cross section and the one or more internal features has a varied geometry from the channel.

13. A method of manufacturing an electric machine, the method comprising:
forming a tube defining a channel through at least a portion thereof through an additive manufacturing process, the channel defining one or more internal features integrally formed with the channel;
positioning one or more wires about a surface of the tube to form a winding, wherein the one or more wires are separated from the channel by the tube;
operably coupling the winding to one of a stator core or a rotor of the electric machine; and
fluidly coupling a cooling system to the channel to provide a fluid through the channel, wherein a flow of the fluid is altered from a laminar flow to a turbulent flow by the internal features, the cooling system including a supply line operably coupled with a first end portion of the channel and a return line operably coupled with a second end portion of the channel.

14. The method of claim 13, wherein the one or more wires are each configured as a Litz-wire having a plurality of strands.

15. The method of claim 13, wherein fluidly coupling the cooling system to the channel includes coupling the supply line to one end portion of the winding and the return line to a second end portion of the winding.

16. The method of claim 15, wherein fluidly coupling the cooling system to the channel further includes fluidly coupling a pump and a heat exchanger in series between the supply line and the return line.

17. A winding assembly for an electric machine comprising:
a tube defining a channel through at least a portion thereof, the tube configured to be operably coupled with a stator or a rotor of the electric machine, wherein the channel includes a first end portion, an opposing, second end portion, and an enclosed body between the first end portion and the second end portion;
a plurality of internal surface features positioned within the channel, wherein a concentration of the plurality of internal surface features is varied along the channel;
one or more wires, the one or more wires positioned along the tube opposite the channel; and
a cooling system including a supply line operably coupled with the first end portion and a return line operably coupled with the second end portion, the cooling system configured to move a cooling fluid through the channel.

18. The electric machine of claim 17, wherein the one or more wires configured as Litz-wires and a cooling system is operably coupled with the channel and configured to move a cooling fluid through the channel.

19. The electric machine of claim 17, wherein the one or more wires includes a first set of wires and a second set of wires, and wherein the tube includes a first tube and a second tube.

20. The electric machine of claim 19, wherein the second set of wires is positioned between the first and second tubes and the first set of wires is positioned around the first tube, the second tube, and the second set of wires.

* * * * *